(12) United States Patent
Mavinahally et al.

(10) Patent No.: US 7,975,660 B2
(45) Date of Patent: Jul. 12, 2011

(54) LAMINATED COUNTERWEIGHT FOR TIMING CONTROL

(75) Inventors: Nagesh S. Mavinahally, Anderson, SC (US); David R. Brower, Townville, SC (US)

(73) Assignee: Techtronic Outdoor Products Technology Limited, Hamilton (BM)

( * ) Notice: Subject to any disclaimer, the term of this patent is extended or adjusted under 35 U.S.C. 154(b) by 492 days.

(21) Appl. No.: 12/137,149

(22) Filed: Jun. 11, 2008

(65) Prior Publication Data

US 2009/0308369 A1 Dec. 17, 2009

(51) Int. Cl.
*F01L 7/06* (2006.01)
(52) U.S. Cl. .................. 123/73 D; 123/73 PP
(58) Field of Classification Search ............. 123/73 R, 123/73 A, 73 D, 73 PP
See application file for complete search history.

(56) References Cited

U.S. PATENT DOCUMENTS

| 1,261,053 | A | 4/1918 | O'Brien |
| 3,119,380 | A | 1/1964 | Armstrong |
| 3,822,682 | A * | 7/1974 | Sherwood .................. 123/73 D |
| 4,342,236 | A | 8/1982 | Everts |
| 5,257,601 | A | 11/1993 | Coffin |
| 5,899,120 | A | 5/1999 | Leith |
| 6,901,892 | B2 | 6/2005 | Mavinahally et al. |
| 6,941,906 | B2 | 9/2005 | Carlsson et al. |
| 7,093,570 | B2 | 8/2006 | Mavinahally et al. |
| 7,210,433 | B2 | 5/2007 | Mavinahally et al. |
| 7,331,315 | B2 | 2/2008 | Mavinahally |

* cited by examiner

*Primary Examiner* — Noah Kamen
(74) *Attorney, Agent, or Firm* — Michael Best & Friedrich LLP

(57) ABSTRACT

A stratified two-stroke engine having a laminated counterweight is disclosed. The laminated counterweight includes a traditional counterweight portion and a laminate portion. The laminate portion has an approximately circular peripheral shape and at least one notch. In operation, the notch may be used to time the opening and closing of a mixture port or a transfer port.

18 Claims, 5 Drawing Sheets

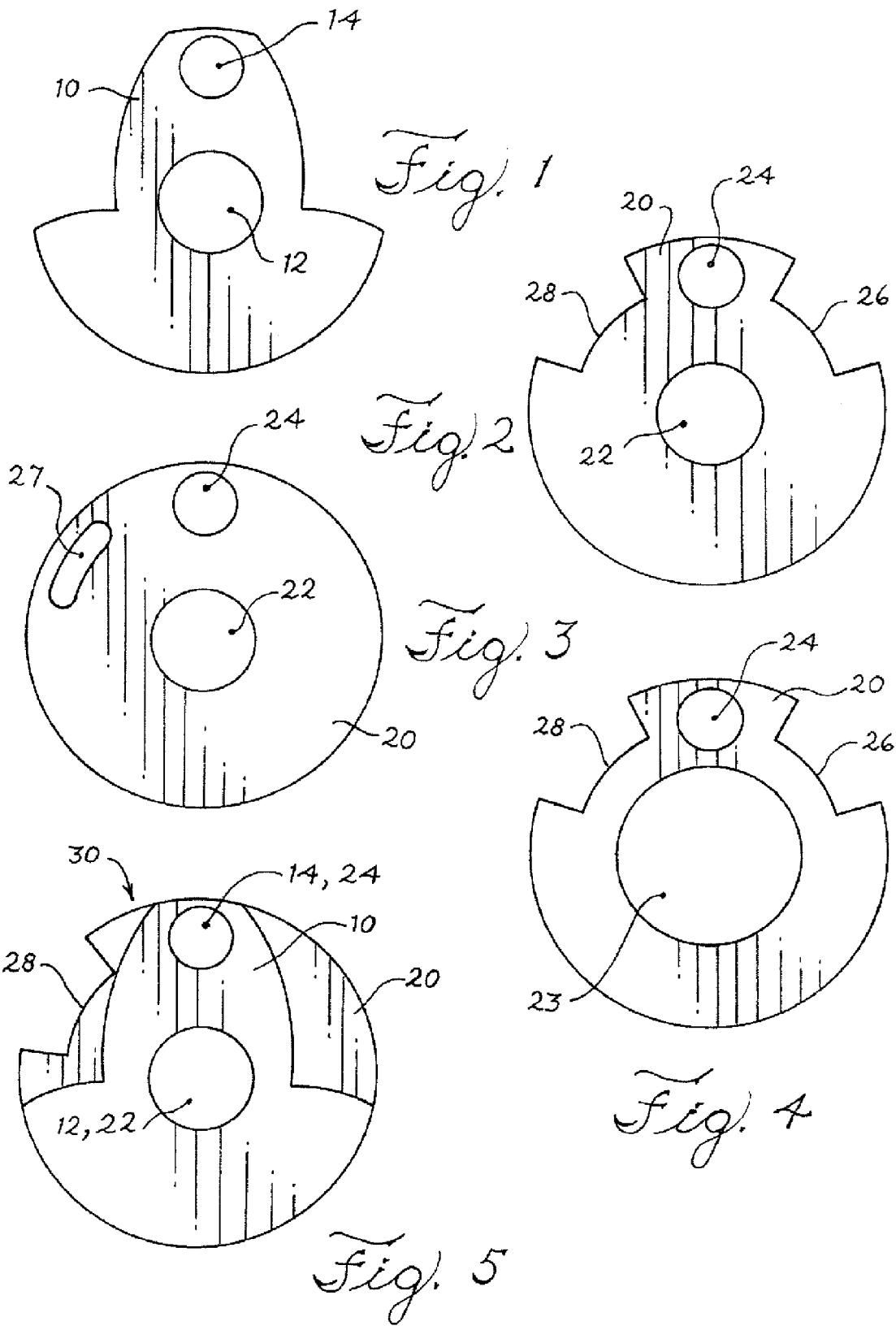

LAMINATED COUNTERWEIGHT FOR TIMING CONTROL

BACKGROUND

The present invention relates generally to stratified two-stroke internal combustion engines and more particularly to rotary valves for timing of engine parameters.

In two-stroke engines, a fuel-air mixture is generally inducted into the crankcase. At selected times, the fuel-air mixture is then communicated from the crankcase to the combustion chamber via transfer passages. For improved engine efficiency, it is desirable to control the volume of fuel-air mixture provided to the crankcase. Typically, the flow of gasses into the crankcase has been controlled either by using the piston to open and close the mixture port to the engine, by having an external rotary valve placed adjacent to the crankcase that times the mixture input port, or using a counterweight to time the mixture input port. Another solution uses electronic fuel injectors to supply selected amounts of fuel to the transfer passages during a portion of the air intake stroke.

Stratified two-stroke engines use pure air trapped in the transfer passages to help scavenge combustion gasses from the engine before the new fuel-air mixture charge enters the combustion chamber. Generally, the fuel-air mixture and the scavenging air are inducted into the engine during the upstroke of the piston. The transfer passages receive pure air from an air port, while the crankcase receives a fuel-air mixture from a mixture port. Alternatively, if an electronic fuel injector is used, the fuel may be supplied to the transfer passages at selected times during a portion of the air intake. After fuel injection, additional pure air fills the transfer passage. In many stratified two-stroke engines, the scavenging air may overflow the transfer passages and dilute the fuel-air mixture in the crankcase, or the fuel-air mixture in the crankcase may begin to mix with the scavenging air in the transfer passages. It is desirable to avoid diluting the fuel-air mixture in the crankcase with pure air from the air port. Furthermore, to minimize hydrocarbon emissions, it is desirable to keep the air in the transfer passages as free from the fuel-air mixture as possible.

Each of the four methods of controlling the intake of fuel-air mixture discussed above presents disadvantages. Piston ported mixture ports can only be opened and closed symmetrically with respect to the piston's top dead center (TDC) position. This means that if a mixture port opens at a crank angle θ before piston TDC, it will close at an angle θ after piston TDC. In many instances, it may be desirable to open the mixture port at one angle before piston TDC and close the mixture port at a different angle after piston TDC. External rotary valves, on the other hand, require additional structural housing components affixed to the crankcase. Accordingly, rotary valves add to the size and weight of an engine, as well as adding additional components and complexity. Counterweights, also known as crank webs, used for timing control are typically made from cast metal. In order to properly time the input of gasses to the crankcase, the counterweights are altered in shape so that they are substantially cylindrical instead of the conventional off-center or mushroom-like shape. While counterweights designed for timing control may be used to prevent mixing of the scavenging air and the fuel-air mixture in the crankcase, the altered shape requires additional material, which leads to extra weight and cost. Additionally to properly control the timing of opening and closing of the fuel-air mixture port or transfer passage, the counterweights may require complicated cast passages or voids. Furthermore, the unbalanced shape of conventional counterweights is well suited to balancing out the forces created by the reciprocating piston and rotating crankshaft. However, the nearly cylindrical shape required for the altered counterweights makes the counterweight itself more balanced and thus less capable of offsetting or balancing the other engine forces. Thus, fabricating and balancing counterweights is difficult and costly. Engines using electronic fuel injection require complicated mechanisms and software to control the timing and duration of the injection. Thus, electronic fuel injection adds to both the cost and complexity of the engine.

SUMMARY

A laminated counterweight that may be used to time the opening and closing of a fuel-air mixture port and/or the opening and closing of a transfer passage is provided. The laminated counterweight may include a plastic laminate or a metal laminate, or a laminate of another material. The laminate may even be insert molded onto the counterweight. In one embodiment, the laminate assists in controlling the opening and closing of the fuel-air mixture port and/or transfer passage without requiring an enlarged cast counterweight, thereby saving weight and material. Additional details and advantages are described below in the detailed description.

The invention may include any of the following aspects in various combinations and may also include any other aspect described below in the written description or in the attached drawings.

A two-stroke internal combustion engine is provided. The engine includes a cylinder, a piston in the cylinder, a combustion chamber defined by the cylinder and the piston, a crankcase attached to the cylinder, a crankshaft for rotation in the crankcase, a counterweight attached to the crankshaft, and a connecting rod that connects to the piston via a connecting pin and to the counterweight via a crank pin. The piston reciprocally drives the crankshaft via the connecting rod. The engine also includes a passage that opens at a port. A laminate coupled to the counterweight includes a notch that opens and closes the port from the passage.

A counterweight for an internal combustion engine is provided. The counterweight is connected to a crankshaft and to a crank pin for a connecting rod. A laminate with an aperture to fit around the crankshaft is coupled to the counterweight and a notch is included along a portion of the laminate.

A stratified two-stroke internal combustion engine is provided. The stratified two-stroke internal combustion engine includes: a cylinder; a piston in the cylinder; a combustion chamber defined by the cylinder and the piston; a crankcase attached to the cylinder; a crankshaft for rotation in the crankcase; a connecting rod having two ends, a first end attached to the counterweight by a crank pin, and a second end connected to the piston by a connecting pin, wherein the piston is arranged to reciprocally drive the crankshaft via the connecting rod; an air passage opening into the cylinder at an air port; a transfer passage providing fluid communication between the crankcase and the combustion chamber, and having a transfer port, and wherein at selected times the air passage is in communication with the transfer passage; a laminate coupled to the counterweight; and a notch disposed along a portion of the laminate; wherein the laminate and the notch open and close the transfer port.

BRIEF DESCRIPTION OF SEVERAL VIEWS OF THE DRAWINGS

The invention may be more fully understood by reading the following description in conjunction with the drawings.

FIG. 1 is a plan view of one embodiment of a counterweight.

FIG. 2 is a plan view of one embodiment of a laminate for use in a laminated counterweight.

FIG. 3 is a plan view of an alternate embodiment of a laminate for use in a laminated counterweight.

FIG. 4 presents an alternate embodiment of the laminate for use with in a laminated counterweight.

FIG. 5 is a plan view of one embodiment of a laminated counterweight.

DETAILED DESCRIPTION

Figure 6:
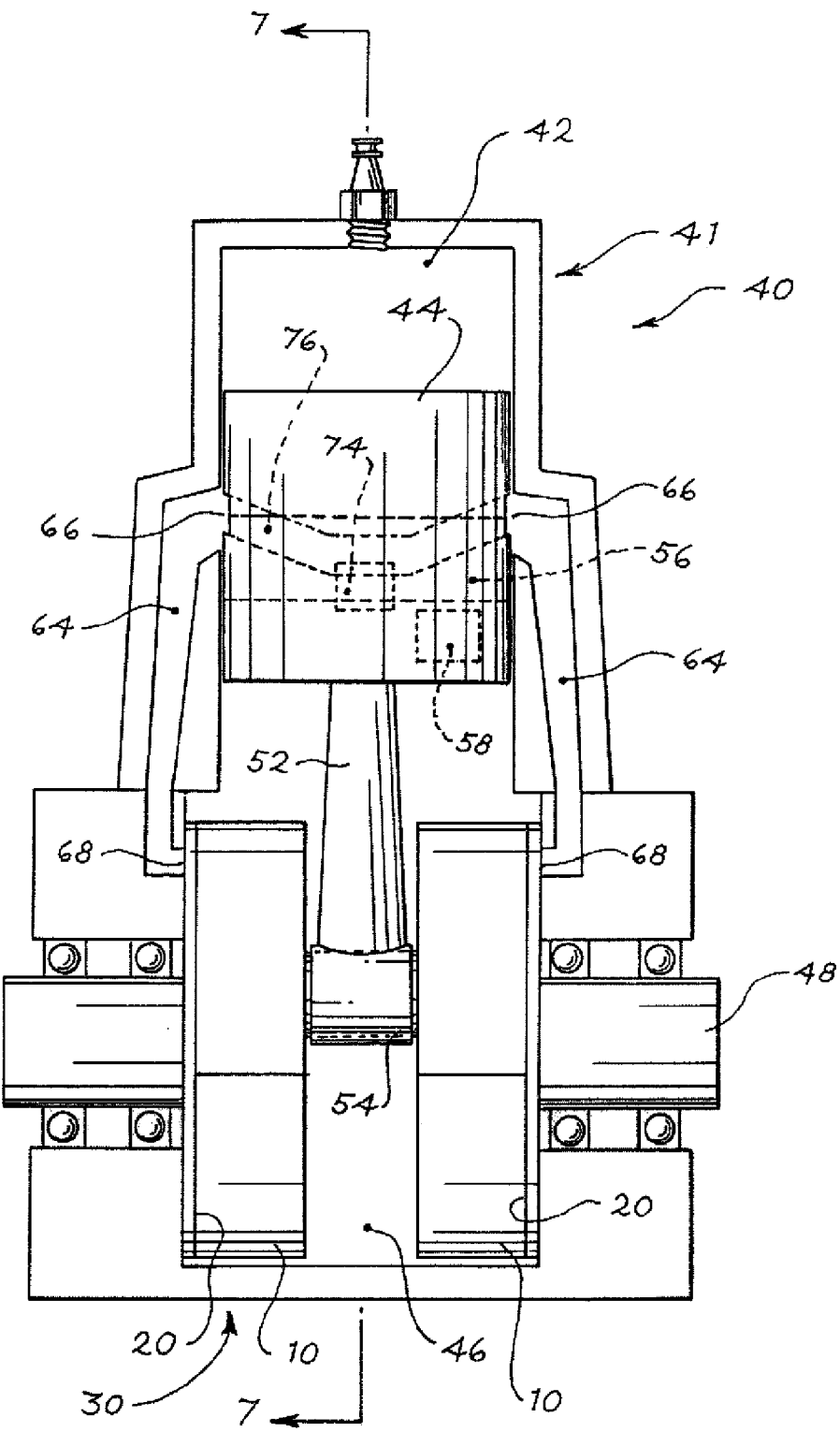
FIG. 6 is a cross-sectional view of a stratified two-stroke engine having one embodiment of the laminated counterweight.

Referring now to the drawings, it should be noted that common parts will be referred to using the same reference number throughout this Detailed Description. FIG. 1 presents a plan view of one embodiment of a counterweight 10. Those skilled in the art will recognize that the peripheral shape of the counterweight 10 is conventional. This shape provides an unbalanced structure well suited to balancing the other engine forces as discussed above. Unlike conventional counterweights, which are generally cast or formed monolithically with the crankshaft and crank pin, in one embodiment the counterweight 10 may be a component part. The counterweight 10 may include a crankshaft aperture 12 to connect the counterweight 10 to the crankshaft 48 (see FIG. 6) of a two-stroke engine. A crank pin aperture 14 may be used to attach the counterweight 10 to a crank pin 54, which may be used to connect the counterweight 10 and crankshaft 48 to a piston 44. Like conventional counterweights, the counterweight 10 may be made from machined or cast metal materials, such as steel. However, those skilled in the art recognize that other materials may be used as well.

FIG. 2 presents a plan view of one embodiment of the laminate 20 or laminate plate. The laminate 20 includes at least one arcuate notch 28 and may include a plurality of notches. For example, in this embodiment, two notches 26 and 28 are shown. It should be understood that the notches 26 and 28 of the laminate 20 may be placed around the periphery of the laminate 20 as shown in FIG. 2, or the notches 27 may be placed internally in the laminate 20 so as to be bounded by the laminate 20 as shown in FIG. 3. Furthermore, when a plurality of notches is included, it may be desirable to include notches having various sizes. In the embodiment shown in FIG. 2, the laminate 20 includes a crank aperture 22 for a crankshaft 48, and a crank pin aperture 24 for a crank pin 54. However, it may be desirable to only have a central aperture 22 for the crankshaft, for example when the crankshaft and counterweights are monolithic. In some embodiments, it may be desirable for the laminate to comprise a disk having an enlarged central opening 23. An example of a laminate 20 having an enlarged central opening 23 is shown in FIG. 4. Similar to the embodiments in FIGS. 2-3, laminates 20 having enlarged central openings 23 may include peripheral or internal notches. Among other advantages, laminates 20 having enlarged central openings may help to reduce the weight of the engine.

As described below, the laminate 20 is coupled to a counterweight 10 and placed in the crankcase 46 of a stratified two-stroke engine. Therefore, the laminate 20 must be made from a material that is able to withstand temperatures that exist in the crankcase 46. In some embodiments, the laminate 20 may be made from stamped metal, such as aluminum or steel, or from a plastic material. However, those skilled in the art understand that a laminate 20 may be made from any material that can withstand the temperatures and chemicals, such as fuel, within the crankcase 46.

FIG. 5 presents one embodiment of the laminated counterweight 30. In this embodiment, the crank aperture 22 of the laminate 20 corresponds with the crank aperture 12 of the counterweight 10. Similarly, the crank pin aperture 24 of the laminate 20 corresponds with the crank pin aperture 14 of the counterweight 10. The laminated counterweight 30 may be constructed by mechanically fastening the laminate 20 to the counterweight 10, for example using rivets. Alternatively, when plastic materials are used for the laminate 20, the laminated counterweight 30 may be formed by insert molding. In this case, a counterweight 10 is partially placed within the mold into which the laminate 20 is molded. Those skilled in the art understand that it may be desirable to first roughen or gnarl the surface of the counterweight 10 to which the laminate 20 is to be formed.

With the laminated counterweight shown in FIG. 5, a crankshaft assembly would be made by press fitting a crankshaft into the crank apertures 12 and 22. The crank pin would then be press fit into the crank pin apertures 14 and 24. The resultant crankshaft assembly rotates in the engine as a single built-up component.

Alternatively, a monolithic crankshaft, counterweight, and crank pin may be used with a laminate 20. In this embodiment, the laminate 20 includes a crankshaft aperture 22, but no crank pin aperture 24. The laminate 20 is then fit over the crankshaft so that it is flush with one counterweight, and then mechanically fastened to the counterweight. In another embodiment, the laminate may be insert-molded onto the counterweight of a monolithic crankshaft, counterweight, and crank pin.

FIG. 6 presents a cross-section of an exemplary stratified two-stroke engine 40. While FIG. 6 shows laminates 20 attached to the counterweights 10, the contents of this paragraph, and the two paragraphs that follow, describe the functionality of engines not having these laminates 20. Stratified two-stroke engines 40 typically include a cylinder 41, a crankcase 46, and at least one transfer passage 64 connecting the crankcase 46 and a combustion chamber 42 in the cylinder 41. The crankcase 46 and cylinder 41 are attached to each other, for example by fasteners or by virtue of being monolithically manufactured. A crankshaft 48 is mounted in the crankcase 46, and connects to at least one counterweight 10. The crankshaft 48 and counterweight 10 connect to a connecting rod 52 by way of a crank pin 54. The other end of the connecting rod 52 connects to a piston 44 by way of a connecting pin 56.

Figure 8:
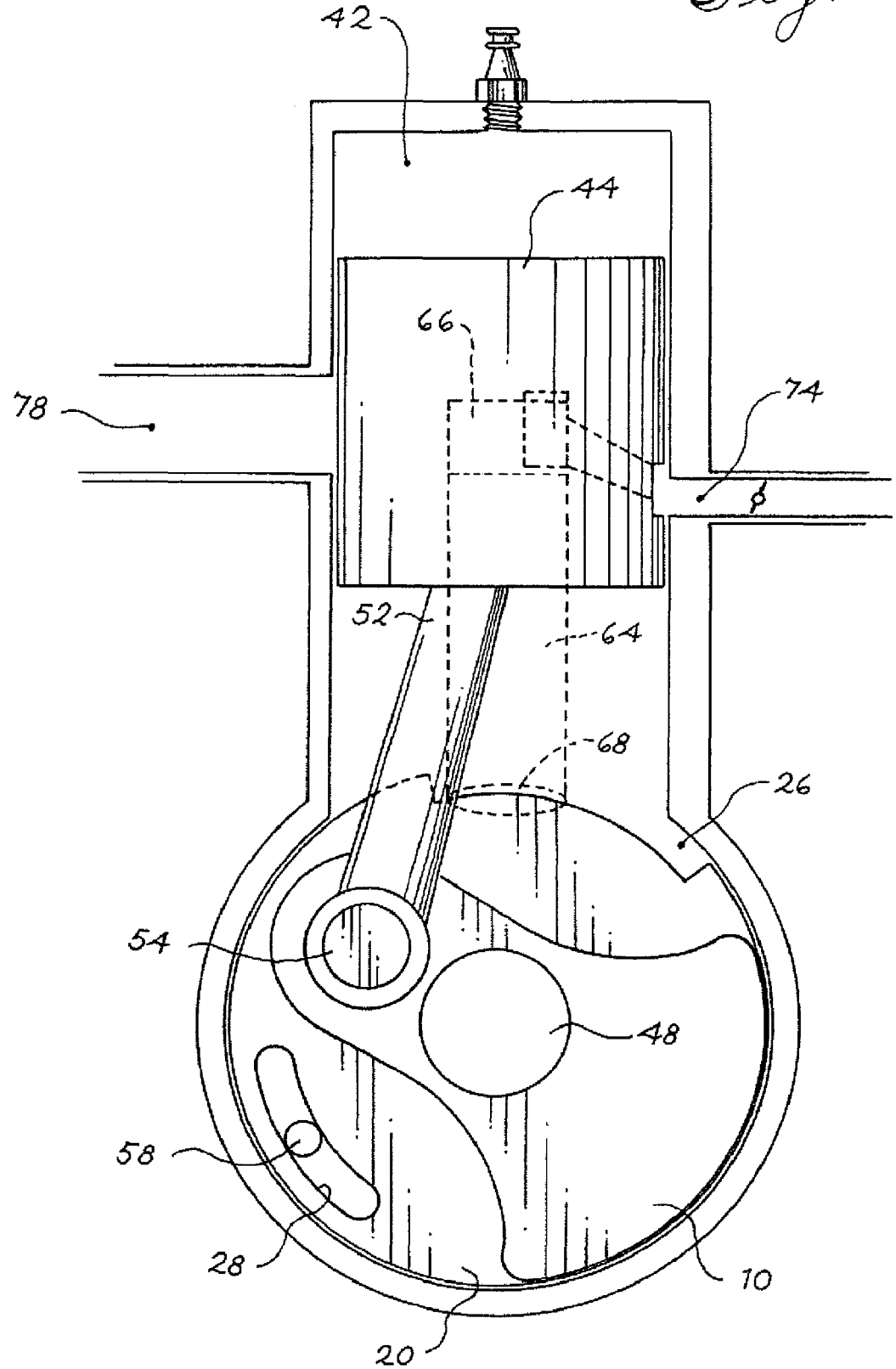
FIG. 8 is a cross-sectional view of an embodiment of the stratified two-stroke engine having a mixture port in the crankcase.

In operation, as the piston 44 of the stratified two-stroke engine 40 moves in its upstroke, negative pressure develops in the crankcase 46. As the negative pressure builds, a mixture port 58 opens and fuel-air mixture is pulled into the crankcase 46. In FIG. 6, the mixture port 58 is opened once the piston 44 ascends above the bottom of the mixture port 58 in the cylinder 41. However, those skilled in the art recognize that the mixture port 58 may be placed in the crankcase instead of the cylinder 41 (as shown in FIG. 8). FIG. 6 shows the mixture port 58 offset, below and to the side of the air port 74, however, it should be understood that the mixture port may be placed in a variety of positions relative to the air port, including directly below the air port. As the fuel-air mixture is pulled into the crankcase 46, an air port 74 is placed in fluid communication with at least one transfer passage 64. Thus, the transfer passage 64 is filled with pure air while the crankcase 46 is filled with a fuel-air mixture. In this embodiment, the air port 74 connects to the transfer passage 64 via a piston channel 76, when the piston 44 is in a position in which the piston channel 76 connects to both the air port 74 and first transfer port 66. However, those skilled in the art understand that the air passage may connect with the transfer passage 64 in numerous other ways. For instance, the air passage may include a reed valve and connect directly to the transfer passage 64 as was shown in U.S. Pat. No. 6,901,892 entitled Two Stroke Engine with Rotatably Modulated Gas Passage. The contents of U.S. Pat. No. 6,901,892 are herein incorporated by reference.

After combustion, which may occur when the piston 44 is in the region of TDC, the piston 44 descends. Although not visible in FIG. 6 due to the sectional view, an exhaust port 78 (visible in FIG. 7) is also provided in the combustion chamber 42. Once the piston descends below the exhaust port 78, the combustion gasses in the combustion chamber 42 escape thereby reducing the pressure in the combustion chamber 42. At the same time, the pressure in the crankcase 46 increases as the piston 44 descends. After the piston 44 descends below a first transfer port 66, the transfer passages 64 open to the combustion chamber 42. At this point, the pure air in the transfer passages 64 flows into the combustion chamber 42 and helps to drive the remaining combustion gasses out the exhaust port 78. As the air charge, or scavenging air flows into the combustion chamber 42, the fuel-air mixture in the crankcase 46 flows into the transfer passage 64 through a second transfer port 68 and then into the combustion chamber 42 through the first transfer port 66. Ideally, the piston 44 closes the exhaust port 78 just before any of the fuel-air mixture escapes.

Figure 7:
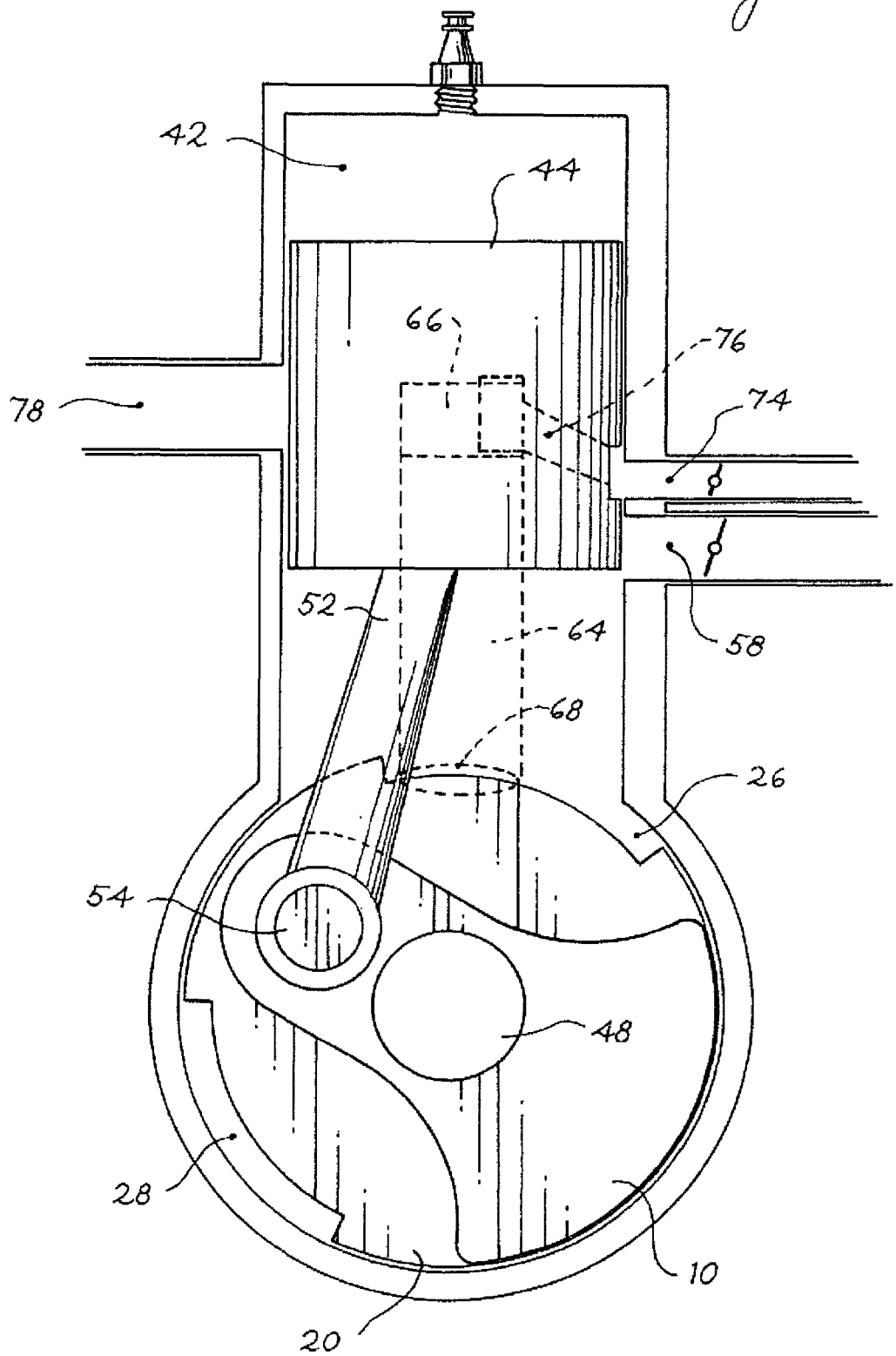
FIG. 7 is a cross-sectional view of the stratified two-stroke engine shown in FIG. 6 but from a perspective rotated 90 degrees as indicated by line 7-7 in FIG. 6.

In the embodiment shown in FIGS. 6-8, laminates 20 have been attached to conventionally shaped counterweights 10. Because the laminates 20 are extremely light, and because the notches are relatively small, the laminates only have a minor influence on the balancing characteristics of the laminated counterweight 30. Furthermore, to the extent the laminates 20 impact balancing, this can be overcome by adding or removing small amounts of material from the counterweights 10.

In the embodiment shown in FIGS. 6 and 7, the notches 26 and 28 of the laminated counterweight 30 are used to time the opening and closing of a second transfer port 68 located in the crankcase 46. During the upstroke of the piston 44, a first notch 28 aligns with the second transfer port 68 to allow scavenging air to be pulled from the air port 74, through the piston channel 76, and into the transfer passages 64. The notch 28 is designed to allow communication between the transfer passage 64 and the crankcase 46 for a duration to allow scavenging air to fill the transfer passage 64. The piston 44 then completes its upstroke, combustion occurs, and the piston 44 begins its down-stroke. During the down-stroke, the second notch 26 aligns with the second transfer port 68 allowing the scavenging air trapped in the transfer passage 64 to flow into the combustion chamber 42 followed by the fuel-air mixture from the crankcase 46. The second notch 26 does not necessarily align with the second transfer port 68 as soon as the first transfer port 66 opens to the combustion chamber 42. Instead, it may be desirable to allow the pressure in the crankcase to build prior to having the second notch 26 align with the second transfer port 68. In this manner, the combustion gasses in the combustion chamber 42 may begin to escape through the exhaust port 78 prior to any air-assisted scavenging. Additionally, when the second transfer port 68 is opened by the second notch 26, the pressure in the crankcase 46 forcefully expels the scavenging air into the combustion chamber 42 resulting in better scavenging of the combustion gasses. After the scavenging air flows into the combustion chamber 42, the fuel-air mixture from the crankcase 46 flows into the combustion chamber 42. The second notch 26 then closes the second transfer port 68 allowing a negative pressure to build in the crankcase before the mixture port 58 and air port 74 are opened by the first notch 28 aligning with the second transfer port 64. Closing the transfer passage 64 to the crankcase between notches 26 and 28 reduces or prevents mixing of fuel and air in the transfer passages 64 and/or the crankcase 46.

The embodiment shown in FIG. 8 operates in substantially the same manner as the embodiment shown in FIGS. 6 and 7. However, the mixture port 58 in the embodiment shown in FIG. 8 is located in the crankcase 46 and not in the cylinder 41. In this embodiment, the notches 26 and 28 in the laminate time the opening and closing of both the second transfer port 68 and the mixture port 58. Notches 26 and 28 are shown positioned at different radii from the center of the laminate. However, those skilled in the art realize that the notches could have the same radial positioning.

While the engines shown in FIGS. 6-8 include two notches 26 and 28, it may be desirable in some instances to use only one notch. Alternatively, when the mixture port is placed in the crankcase 46 instead of in the cylinder 41, it may be desirable to include multiple notches at different radii from the center of the crankshaft 48. These separate notches may allow for different timing of the opening and closing of both the mixture intake into the crankcase 46 and the second transfer port 68 to the transfer passage 64. Furthermore, in some embodiments, it may be desirable to have the opening and closing of the second transfer port 68 or the mixture port 58 occur asymmetrically. In asymmetric embodiments, the first notch 26 will be placed at a first position ahead of a position the laminate will be in when the piston is at TDC, and the second notch 28 will be placed at a different position trailing the TDC position. Commonly, these positions are measured in terms of the crank angle before or after piston TDC.

Figure 9:
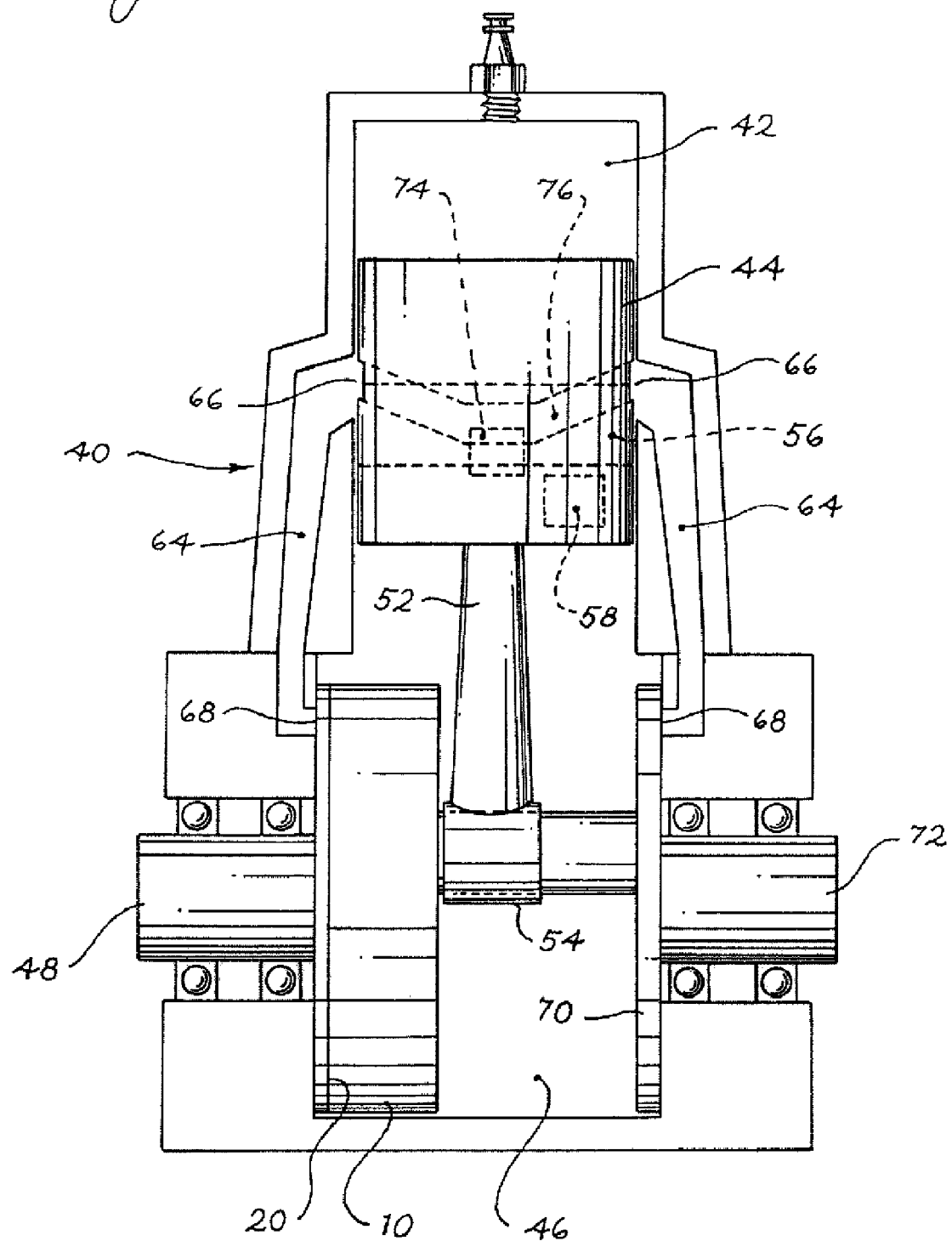
FIG. 9 is a cross-sectional view of a stratified two-stroke engine having a half-crank crankshaft and another embodiment of the laminated counterweight.

An alternate embodiment shown in FIG. 9 allows for laminate controlled timing of multiple transfer passages 64 in half-crank, two-stroke engines. This embodiment includes all of the features from the embodiment presented in FIGS. 6 and 7, except that the crankshaft 48 is only supported in the left side of the crankcase 46. A laminate shaft 72 is supported in the right side of the crankcase 46, and may be supported by smaller bearings than the crankshaft since the laminate shaft 72 does not carry the output load of the engine. The laminate shaft 72 supports a second laminate 70. However, the second laminate 70 need not be attached to a counterweight. Instead, the second laminate 70 is attached to and driven by the crank pin 54. In some embodiments, the connection between the second laminate and the crank pin 54 may allow some play, but it may also be a tight connection. Although the laminate shaft 72 and the crankshaft 48 share a common axis, the laminate shaft 72 need not be the same diameter as the crankshaft 48. Additionally, the laminate shaft 72 may be made from any material that can withstand the temperatures and chemicals, including fuel, present in the crankcase 46. In FIG. 9, the second laminate 70 is thicker than the laminate 20. While this may be desirable, this need not be the case. In operation, the embodiment shown in FIG. 9 functions in generally the same manner as described in association with FIGS. 6 and 7. It may also be desirable to include inserts in the second transfer port to maintain a proper seal against the laminate. The insert may consist of a plastic material capable of withstanding the crankcase environment. However, those skilled in the art understand that other materials may be used as well.

While the figures presented herein show stratified two-stroke engines having two transfer passages, it should be understood that a laminated counterweight could be used with an engine having one transfer passage, or having three or more transfer passages.

It should also be understood that a laminated counterweight or laminate similar to the ones described above could be used in stratified engines having separate charge channels. An exemplary charge channel is described in U.S. Pat. No. 7,210,433 entitled Stratified Scavenged Two-Stroke Engine and shown in FIGS. 25 and 29 of that patent. The contents of U.S. Pat. No. 7,210,433 are herein incorporated by reference. Another exemplary charge channel is described in U.S. Pat. No. 6,901,892 entitled Two Stroke Engine with Rotatably Modulated Gas Passage and shown in FIGS. 47-49 and 50-53 of that patent. The contents of U.S. Pat. No. 6,901,892 were previously incorporated by reference. In engines such as the ones described in the U.S. Pat. No. 7,210,433 and U.S. Pat. No. 6,901,892 patents, a passage, referred to as a charge channel, provides fluid communication between a carburetor (or the fuel-air passage) and the crankcase. The mixture is then pulled into the charge channel by the pressure building in the crankcase when the piston is moving in an upstroke. When the piston returns on the down stroke, the charge is pushed into the combustion chamber by gasses driven from the crankcase through the charge channel. In engines having charge channels, the notches in the laminate can be arranged to time the opening and closing of the charge channel port into the crankcase. In operation, the laminate times the charge channel opening to allow the fuel-air mixture to be pulled into the charge channel at selected times, and then isolated in the charge channel until another notch opens the channel to the increased pressure in the crankcase, which drives the fuel-air mixture into the combustion chamber. Advantageously, this may result in more efficient scavenging and better separation of the charge and the scavenging air.

Additionally, it should be understood that a laminated counterweight or laminate similar to the ones described above could be used in stratified engines that use electronic fuel injectors instead of carburetors to supply the fuel-air mixture to the engine. An example of a stratified two-stroke engine using electronic fuel injection technology is presented in U.S. Pat. No. 7,331,315 entitled Two-Stroke Engine with Fuel Injection. The engines disclosed in that patent include many features similar to the ones described above, for instance transfer passages formed in the cylinder wall connecting the crankcase and the combustion chamber. The contents of U.S. Pat. No. 7,331,315 are herein incorporated by reference to avoid the unnecessary duplication of the description of these similar engine components. In one embodiment of a two-stroke engine using an electronic fuel injector, fuel may be injected into the transfer passages and then pass to the crankcase. After the fuel-injector stops supplying fuel, pure air fills the upper portions of the transfer passages. Laminated counterweights or laminates may time the opening of the lower port of the transfer passage, thereby timing the stratification, in the same manner described above.

While several embodiments of the invention have been described, it should be understood that the invention is not so limited, and modifications may be made without departing from the invention. The scope of the invention is defined by the appended claims, and all devices that come within the meaning of the claims, either literally or by equivalence, are intended to be embraced therein. Furthermore, the advantages described above are not necessarily the only advantages of the invention, and it is not necessarily expected that all of the described advantages will be achieved with every embodiment of the invention.

We claim:

1. A two-stroke internal combustion engine comprising:
a cylinder;
a piston in said cylinder;
a combustion chamber defined by said cylinder and said piston;
a crankcase attached to said cylinder;
a crankshaft for rotation in said crankcase;
a counterweight attached to said crankshaft;
a connecting rod having two ends, a first end attached to said counterweight by a crank pin, and a second end connected to said piston by a connecting pin, wherein said piston is arranged to reciprocally drive said crankshaft via said connecting rod;
a transfer passage providing fluid communication between the crankcase and the combustion chamber, the transfer passage opening into said crankcase at a transfer port;
a laminate coupled to said counterweight; and
a notch disposed along a portion of said laminate;
wherein said laminate and said notch open and close said transfer port.

2. The engine of claim 1 further comprising a mixture passage opening to the combustion chamber and a mixture port, and said notch opens and closes said mixture port.

3. The engine of claim 2 wherein said notch comprises at least two notches, and one of said notches opens and closes said transfer port and another of said notches opens and closes said mixture port.

4. The engine of claim 1 further comprising:
a laminate shaft disposed in said crankcase;
a second laminate; and
a notch disposed along a portion of said second laminate and wherein said second laminate and said notch open and close said transfer port;
wherein said crankshaft further comprises a half-crank crankshaft; and
wherein said second laminate is connected to said laminate shaft and said crank pin.

5. A counterweight for an internal combustion engine comprising:
a counterweight connected to a crankshaft and a crank pin for a connecting rod;
a laminate having an aperture to fit around said crankshaft;
said laminate having a notch disposed along a portion of said laminate; and
said laminate being coupled to said counterweight)
wherein the notch comprises an arcuate notch formed in a peripheral portion of the laminate.

6. The counterweight of claim 5, wherein the notch is a first notch, the counterweight further comprising a second notch, and wherein the second notch comprises an interior portion of said laminate.

7. The counterweight of claim 5 wherein said notch comprises at least two notches.

8. The counterweight of claim 5 wherein said notch comprises at least two notches, and at least some of said at least two notches have differing sizes.

9. The counterweight of claim 5 further comprising at least two notches, wherein said at least two notches are disposed asymmetrically on said laminate with respect to a crank angle measured from a piston top dead center position to open and close said port.

10. The counterweight of claim 5 further comprising at least two notches, wherein at least one of said at least two notches is disposed at a different radius from a center of said laminate than at least one other of said at least two notches.

11. The counterweight of claim 10 wherein said at least two notches further comprises at least two sets of notches, wherein a first set of notches is disposed at a different radius from a center of said laminate than a second set of notches, wherein the notches of said first and second sets of notches are each disposed asymmetrically with respect to a crank angle measured from a piston top dead center position to open and close a first port and second port, respectively.

12. The counterweight of claim 5 wherein said laminate comprises a metal material.

13. The counterweight of claim 5 wherein said laminate comprises a plastic material.

14. The counterweight of claim 13 wherein said counterweight in is insert-molded onto said laminate.

15. The counterweight of claim 5 wherein said laminate is mechanically fastened to said counterweight.

16. The counterweight of claim 5 wherein said laminate further comprises an enlarged central opening and has an approximately circular peripheral shape.

17. The counterweight of claim 5 wherein said laminate further comprises an approximately circular peripheral shape.

18. A stratified two-stroke internal combustion engine comprising:
- a cylinder,
- a piston in said cylinder;
- a combustion chamber defined by said cylinder and said piston;
- a crankcase attached to said cylinder;
- a crankshaft for rotation in said crankcase;
- a connecting rod having two ends, a first end attached to said counterweight by a crank pin, and a second end connected to said piston by a connecting pin, wherein said piston is arranged to reciprocally drive said crankshaft via said connecting rod;
- an air passage opening into said cylinder at an air port;
- a transfer passage providing fluid communication between said crankcase and said combustion chamber, and having a transfer port, and wherein at selected times said air passage is in communication with said transfer passage;
- a laminate coupled to said counterweight; and
- a notch disposed along a portion of said laminate;
- wherein said laminate and said notch open and close said transfer port.

* * * * *